United States Patent [19]

Klaren

[11] 4,427,053
[45] Jan. 24, 1984

[54] APPARATUS AND METHOD FOR THE CONCENTRATION OF A LIQUID BY EVAPORATION

[75] Inventor: Dick G. Klaren, Hillegom, Netherlands

[73] Assignee: Esmil BV, Netherlands

[21] Appl. No.: 376,025

[22] Filed: May 7, 1982

[30] Foreign Application Priority Data

May 12, 1981 [NL] Netherlands .......................... 8102307

[51] Int. Cl.³ ........................................... F28D 13/00
[52] U.S. Cl. ..................................... 165/1; 34/57 A;
122/4 D; 159/13 A; 159/14; 159/49; 159/16 R;
159/DIG. 3; 165/104.16; 165/108; 422/146;
422/145; 422/139
[58] Field of Search ................. 159/16 R, 14, DIG. 3,
159/49, 13 A; 165/104.16, 108, 1; 34/57 A;
122/4 D; 422/146, 139–147; 134/104, 111, 105;
110/245

[56] References Cited

U.S. PATENT DOCUMENTS

| | | | |
|---|---|---|---|
| 995,776 | 6/1911 | Dunn | 159/14 |
| 2,299,307 | 10/1942 | Cornell | 252/32 |
| 2,488,406 | 11/1949 | Hirsch | 422/146 |
| 2,905,596 | 9/1959 | Findlay | 202/40 |
| 3,266,556 | 8/1966 | Malek | 159/16 R |
| 3,505,111 | 4/1970 | Malek | 159/DIG. 3 |
| 3,514,263 | 5/1970 | Malek | 159/DIG. 3 |
| 3,621,905 | 11/1971 | Hedstrom | 165/104.16 X |
| 3,642,452 | 2/1972 | Roget et al. | 165/108 X |
| 4,035,152 | 7/1977 | Yang et al. | 34/57 A X |
| 4,296,800 | 10/1981 | Johnson | 165/104.16 X |
| 4,300,625 | 11/1981 | Mikhailov et al. | 165/104.16 X |

FOREIGN PATENT DOCUMENTS 49-37562  10/1974  Japan ................................ 422/147

Primary Examiner—Albert W. Davis, Jr.
Attorney, Agent, or Firm—Stevens, Davis, Miller & Mosher

[57] ABSTRACT

Concentration of a liquid by evaporation is performed in a heat exchanger having riser tubes for the liquid and a granular mass fluidized by the liquid to occupy the tubes. At their upper and lower ends the tubes open into upper and lower chambers. A hot medium contacts the tubes to transfer heat to the liquid. In order to render this heat exchanger effective for evaporation concentration, means are provided for vapor collection and discharge from the upper chamber, the riser tubes extend above the base of the upper chamber. A return conduit for recirculation of the liquid and granular mass connects the upper chamber to the lower chamber, opening in each case at a lower level than the riser tubes. Supply and discharge connections for the liquid are at levels lower than the upper ends of the riser tubes.

11 Claims, 3 Drawing Figures

APPARATUS AND METHOD FOR THE CONCENTRATION OF A LIQUID BY EVAPORATION

BACKGROUND OF THE INVENTION

1. Field of the Invention

The invention relates to apparatus and method for the concentration of a liquid by evaporation.

2. Description of the Prior Art

U.S. Pat. No. 4,220,193 illustrates a heat exchanger of the type in which a liquid being treated is passed through a bundle of parallel vertical riser tubes which are connected at their upper and lower ends to upper and lower tanks respectively, and in which a granular mass (i.e. a mass of particles) is present in these riser tubes and in the tanks and in operation is fluidized by this liquid. The heat exchanger is described as being intended for use as a liquid/liquid heat exchanger, and there is no suggestion of evaporation of the liquid flowing through the vertical riser tubes. In the invention below the basic idea is that the heat exchanger should be utilised as an evaporator/concentrator.

SUMMARY OF THE INVENTION

The object of the invention is to provide an apparatus and method for concentration of a liquid by evaporation, based on this heat exchanger, and in particular to adapt the heat exchanger for this purpose.

In the apparatus according to the invention the upper chamber, into which the riser tubes discharge is provided with vapour collection and discharge means, e.g. a vapour tank with vapour outlet, and the riser tubes extend into the upper chamber and preferably also into the lower chamber. At least one downcomer or return conduit for the liquid and the granular mass is provided with its inlet and outlet respectively lower than the openings of the riser tubes in the upper and lower chambers. There are inlet and outlet connections for the liquid before and after treatment, both located at lower levels than the openings of the riser tubes in the upper chamber.

A vapour collection chamber and the upper chamber can be embodied in various ways. They may be separate or may adjoin one another, and it is even possible that the vapour collection chamber should function also as the upper chamber.

In addition, the invention provides a method for the evaporation concentration of a liquid using the apparatus of the invention described above, in which the heat transfer rate through the riser tubes is set so high that the tubes function as a rising film evaporator for the liquid being concentrated. The use of tubes as rising film evaporators is familiar in the chemical and processing industries, so that the expert needs no further explanation as to how the heat load on the riser tubes must be raised so that their liquid contents begins to function as a rising film evaporator.

Rising film evaporators have, in general, the problem that they are subject to extreme fouling, depending on the liquid being concentrated. This is a result of local oversaturation of the liquid. In the use of the apparatus of the invention, it appears that the granular mass remains in the liquid film on the surface of the tube, even when liquid is evaporating by boiling. As a result the granules have a scouring and cleaning effect on the tube walls. The vapour formed by the boiling of the liquid exerts an upward dragging force on the liquid film, so that this film acquires upward momentum, and this sustains the upward velocity which may already be present in the liquid supplied to the riser tubes, and maintains the fluidization.

The vapour formed can escape via the vapour collection and discharge means, and the free escape of the vapour is made easier if the rise tubes extend into the upper tank. The liquid film with the granules entrained in it flows over the edges of the riser tubes and can subsequently escape via the return conduit and the discharge connection for the liquid. Since this discharge connection and the return conduit open at points lower than the exits of the riser tubes in the upper tank, this gives rise to a circulation.

In one form of the apparatus of the invention, the return conduit is located outside a casing or housing around the riser tubes. This casing has the function of conducting a relatively hot gas or a liquid around the riser tubes. If the return conduit is outside this casing, no heat is supplied to it, so that no boiling can take place in it.

Depending on the conditions of operation, for instance depending on the viscosity of the liquid, it may be necessary to provide the return conduit with a pump. Given the vulnerability of a pump to the presence of the granules in the liquid, it is preferred that the return conduit contains a cyclone to separate the granular mass from the liquid, both discharges from the cyclone being connected to the lower chamber, preferably being connected together as a return line. A discharge connection for treated liquid free of granules is also connected to the liquid outlet of the cyclone. That part of the liquid in the return conduit which is not removed from the system via the discharge connection may serve to wash the pellets from the cyclone to the lower chamber.

In another form of the apparatus the return conduit runs between or among the riser tubes. In this case it is important that the heat transfer to the return conduit is so small that no boiling can take place there, otherwise there will occur an incomplete circulation of the liquid granule mixture. This can be achieved by giving the return conduit a larger diameter than the riser tubes, or by making its wall of a thickness or of a material such that the heat transfer coefficient per unit surface area is lower than in the riser tubes. The apparatus can then be operated so that, as a result of the heat load on the riser tubes, there occurs a natural circulation of the liquid-granule mixture. However, it is also possible to obtain a forced circulation by giving the liquid under treatment a pressure head.

In all cases it is important to take care that there is a good distribution of the liquid being treated over the various riser tubes. Various proposals have already been made for this, among which for the present apparatus a horizontal apertured distribution plate in the lower chamber is preferred. Particular advantage can be obtained if distribution tubes are mounted in the apertures of the distribution plate and project on both sides above and below the distribution plate. The use of a distribution plate is especially important if the supply inlet for the liquid to be treated and/or the end of the return conduit are located below the plate in the lower tank. However, the supply inlet of the liquid to be treated can be situated elsewhere, for instance in the upper chamber or in the side wall of the lower chamber.

It has already been suggested that the discharge of treated liquid from the apparatus can take place via the return conduit. However, there may alternatively be a separate discharge connection for treated liquid at the bottom of the upper chamber or in the side wall of the lower chamber. In this case there is an advantage if this discharge connection located near and above the level of the lower openings of the tubes. If a distribution plate is used with distribution tubes in it, it is preferred that supply and discharge connections for the liquid should be located in the wall of the lower tank below the distribution plate and above the lower openings of the distribution tubes.

BRIEF DESCRIPTION OF THE DRAWINGS

Preferred embodiments of the invention will now be described by way of non-limitative example, with reference to the accompanying drawings, in which.

Corresponding components in the different embodiments are indicated by the same reference numbers in the three figures.

DESCRIPTION OF THE PREFERRED EMBODIMENTS

Figure 1:
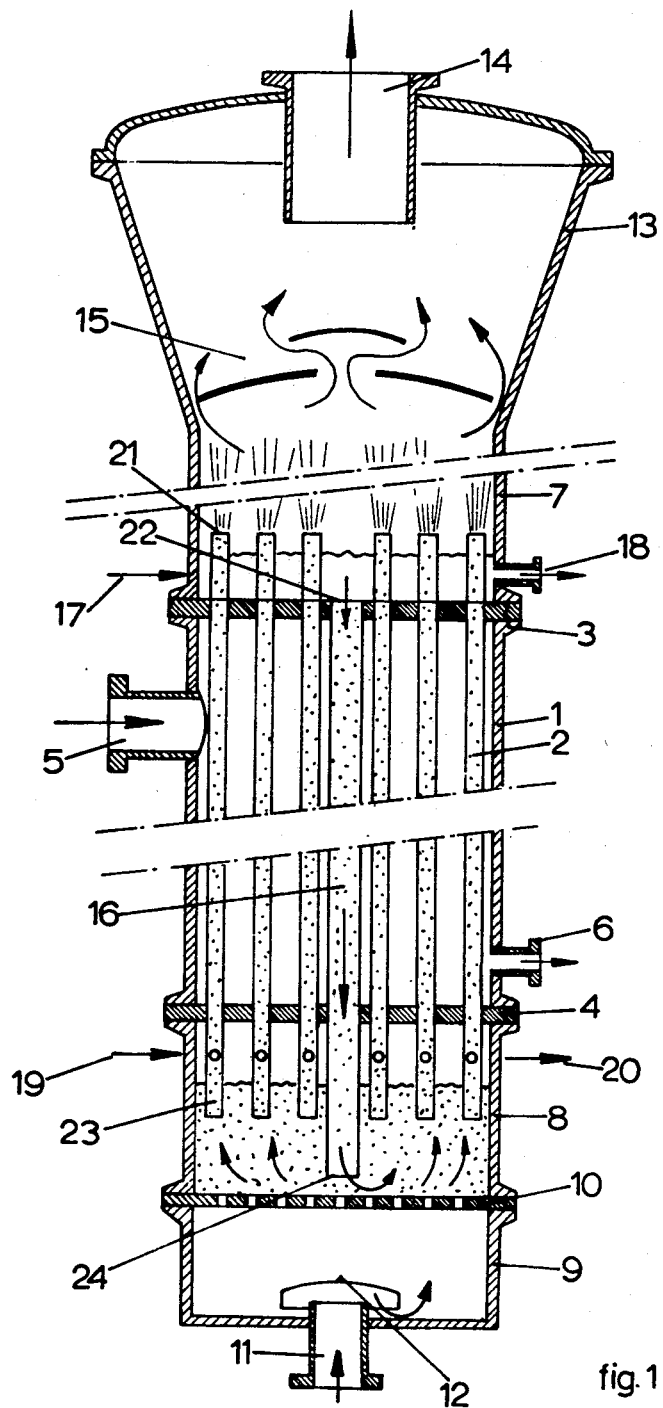
FIG. 1 shows a first embodiment of the invention, schematically in vertical section.

The apparatus shown in each Figure has a central heat exchanger unit bounded by a casing 1 and upper and lower tube header plates 2 and 3. A plurality (or bundle) of parallel vertical riser tubes 2 for upward flow of the liquid being treated (which is for example aqueous) extend through the space within the casing 1 and are mounted in the header plates 2 and 3. The tubes 2 project above the upper plate 3 and below the lower plate 2 and are open at their upper and lower ends. The space within the casing 1 and around the tubes 2 contains, in use, a flowing heat transfer medium, for instance steam, which enters via connection 5 and escapes via connection 6. The heat transfer medium, being hotter than the liquid in the tubes 2 effects heating of the liquid to evaporate it by heat transfer through the tube walls.

The tubes 2 terminate in an upper tank 7 and a lower tank 8. The base part 9 of the lower tank 8 is separated from the rest of the lower tank by a horizontal perforated flow distribution plate 10. The liquid to be treated flows in via a base connection 11 and here a baffle 12 serves as an initial flow distributor.

The apparatus contains a granular mass which is fluidized by the upward flow of the liquid being treated so as to occupy at least the tubes 2. The function of this granular mass, whose use is already known, is mentioned above. In practice, the mass is transported by the liquid through the tubes 2 into the upper tank 7. Its return is described below.

Above the upper tank there is a vapour collection tank 13 with a vapour discharge 14. The steam emitted from the riser tubes 2 is pre-dried by baffles 15.

FIG. 1 shows a central downward return line 16 located among the tubes 2 and having a diameter greater than that of each riser pipe 2. The effect of this is a lower heat transfer per unit of fluid flowing through it than there is in the riser tubes 2, and this suppresses boiling in the return tube 16. The function of the return line 16 is to allow passage of the liquid being treated and the granular mass entrained thereby from the upper tank 7 to the lower tank 8 for recirculation. It is necessary to recirculate the granular mass and the amount of recirculation of the liquid depends on the process in question.

Various possible supply locations 11,17,19 and discharge locations 18,20 for the liquid being treated are indicated in FIG. 1. All these are below the upper ends 21 of the tubes 2.

Supply inlets at location 17 or 19 make unnecessary the supply inlet at location 11 and thus also the use of the distribution plate 12. Discharge at location 20 has a particular advantage that it takes place at a level at which there are no granules so that the concentrated liquid does not have to be separated from entrained granules. It is clearly apparent in FIG. 1 that the openings 21 of the riser tubes in the upper tank lie above the location of the entry opening 22 of the return pipe 16, the level of the discharge connection 18 and the level of the fluidized granular mass in the upper tank 7. Likewise the entry openings 23 of the riser tubes 2 in the lower tank 8 are located lower than the possible inlet connection 19 and the possible outlet connection 20, but higher than the outlet opening 24 of the return pipe 16. It is indicated schematically that vapour sprays out of the tubes. The result of this is that the vapour formed in the riser pipes forms a rising film of liquid against the inner surfaces of the tubes 2, and the granules are located in this film. Unevaporated liquid and the granules flow over the upper edge 21 of the riser tubes onto the base of the upper tank formed by the plate 3.

Figure 2:
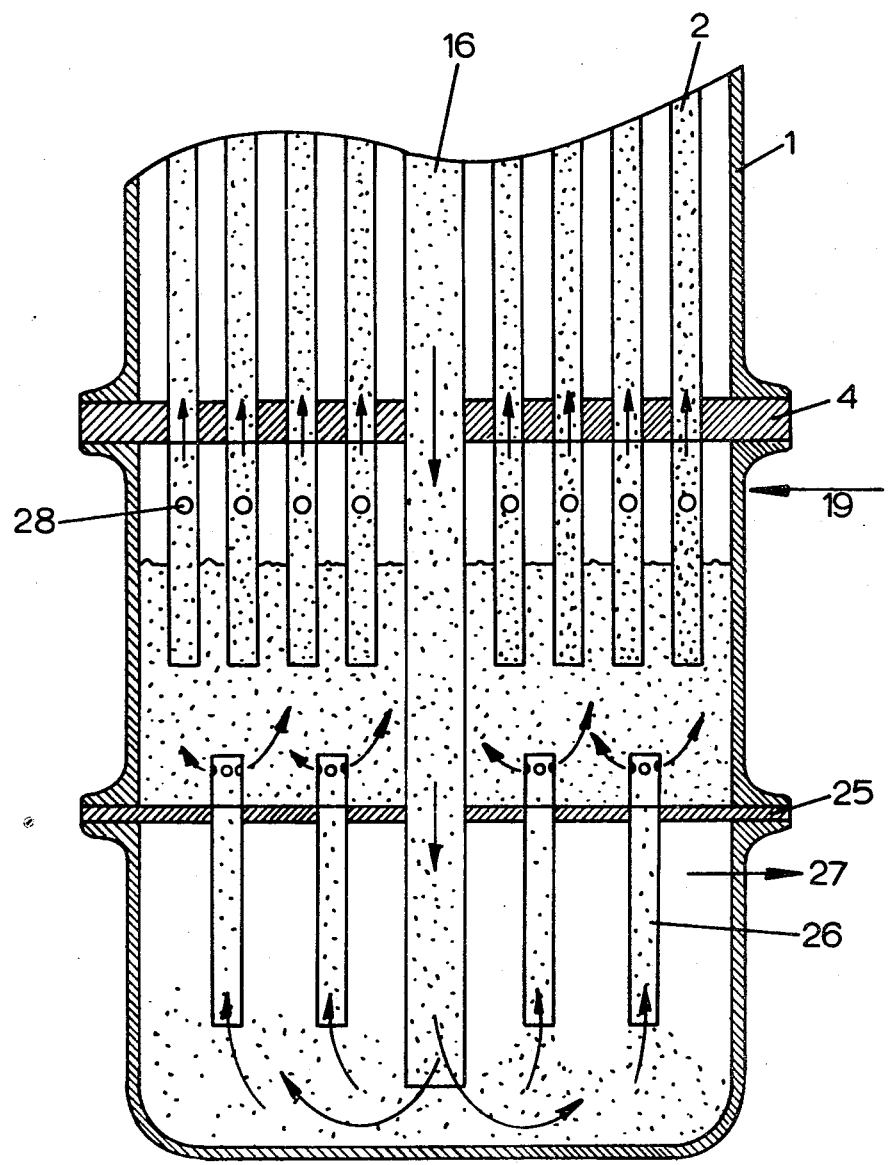
FIG. 2 shows on an enlarged scale the lower end of yet another embodiment of the invention.

FIG. 2 shows a modified form of the apparatus of FIG. 1 in which no inflow of the liquid to be concentrated occurs through into the base part 9. The flow distribution plate in the lower tank 8 is here embodied as a plate 25 with distributor pipes 26 mounted in it and projected above and below it. The liquid and granules flow through the pipes 26. The return pipe 16 empties below the distribution plate 25. By this means, the spaces directly under the header plate 4 and directly under the distribution plate 25 are free of granules. The supply of the liquid to be concentrated to the location 19 and discharge of the concentrated liquid at location 27 can then result in a favourable operational process.

Figure 3:
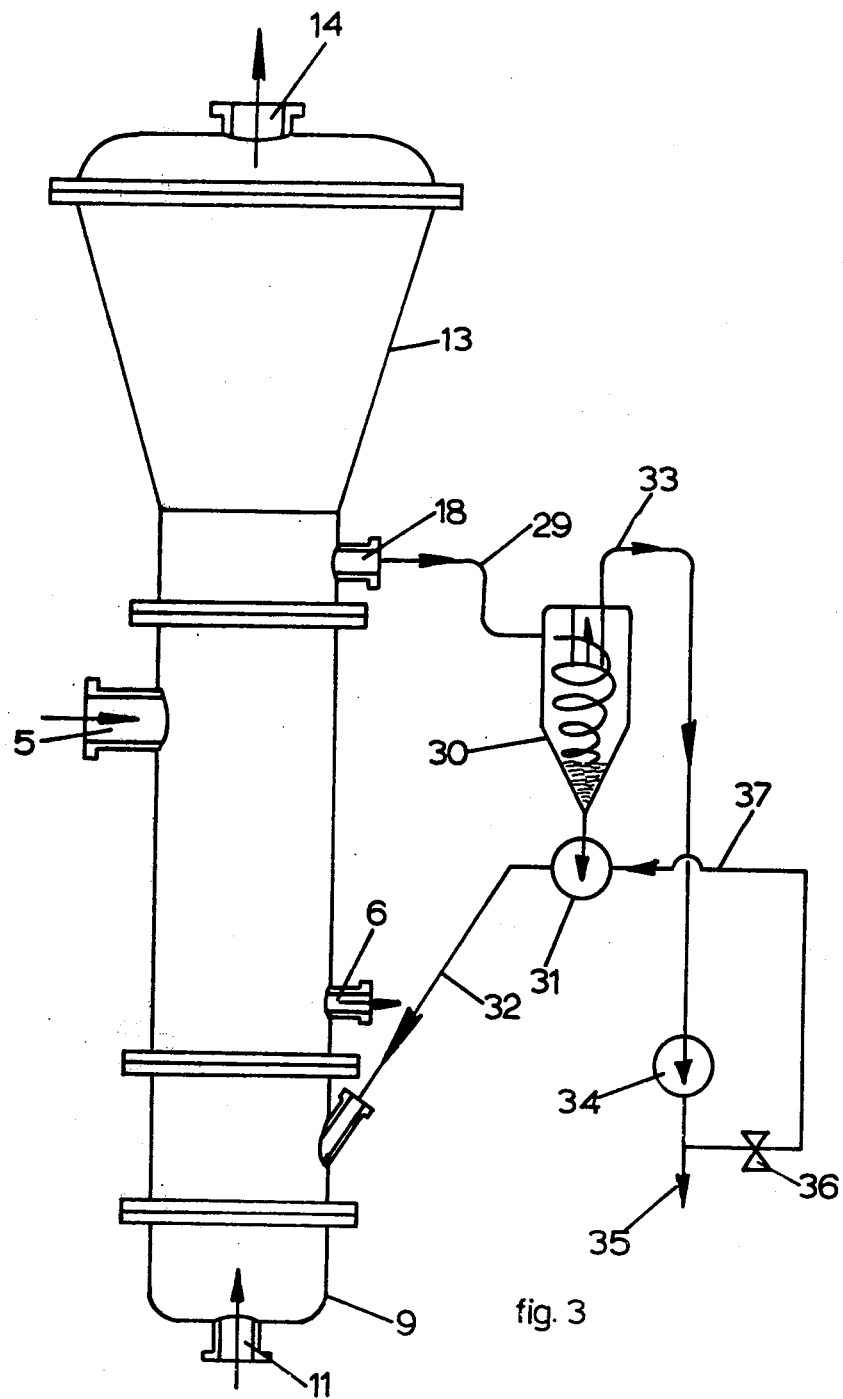
FIG. 3 shows still another embodiment with a return conduit outside the riser tube bundle.

FIG. 3 shows an embodiment of the apparatus according to the invention in which there is no return line among the riser tubes 2. In place of this, a return line 29 is connected to the discharge connection 18 in the upper tank. Granules present occurring in the liquid removed via line 29 are separated in a cyclone 30, and the granule-free liquid is pumped away via a line 33 and a pump 34. This liquid is partly removed from the system via a discharge line 35 as a concentrated liquid, and partly conveyed via a valve 36 and a line 37 to an ejector 31, which sucks the granules separated in the cyclone 30 through a line 32. The liquid in the line 37 then washes the granules into the lower tank 8, completing the return path.

What is claimed is:

1. Apparatus for the concentration of a liquid by evaporation comprising
   (a) a heat exchanger having a plurality of upwardly extending riser tubes for flow of the liquid being treated, which tubes have open upper and lower ends and in use are contacted by a relatively hot medium for heat transfer to the liquid being treated,
   (b) upper and lower chambers respectively above and below the heat exchanger, the riser tubes opening at respectively their upper and lower ends into said upper and lower chambers, the upper chamber having a base and the riser tubes extending above that base, (c) a granular mass which is fluidizable in use by the flow of the liquid being treated so as to occupy at least the said riser tubes, (d) means for vapour collection and discharge from the upper chamber, (e) at least one return conduit for passage of the liquid being treated and the granular mass from the upper chamber to the lower chamber, which return conduit is connected into the upper and lower chambers in each case at a lower level than the opening of the riser tubes into the respective chamber, and (f) supply and discharge connections for the liquid being teated located at levels lower than the opening of the riser tubes into the upper chamber.

2. Apparatus according to claim 1 having a housing surrounding the riser tubes and the said return conduit being located outside said housing.

3. Apparatus according to claim 2 wherein the return conduit includes a cyclone for separation of the granular mass from the liquid being treated, the cyclone having respective outlets for the granular mass and the liquid both of which are connected to the lower chamber, and there being a line connected to the liquid outlet of the cyclone for discharge of the treated liquid from the system free of the granular mass.

4. Apparatus according to claim 1 wherein the return conduit runs among the riser tubes.

5. Apparatus according to claim 4 wherein the return conduit is a tube of larger diameter than each riser tube.

6. Apparatus according to one of claims 4 and 5 wherein the return conduit is a tube having a wall of lower thermal conductivity per unit area than the riser tubes.

7. Apparatus according to claim 1 wherein there is a horizontal apertured liquid flow distribution plate in the lower chamber below the opening of the riser tubes.

8. Apparatus according to claim 7 wherein distributor tubes are mounted in the apertures in the distribution plate, for flow of the liquid through the plate via the distributor tubes, each distributor tube extending both above and below the plate.

9. Apparatus according to claim 8 wherein at least one of the said supply connection and the discharge connection for the liquid being treated is located in the lower chamber at a level below the distribution plate and above the lower ends of the distributor tubes.

10. Apparatus according to any one of claims 1, 7 and 8 wherein the riser tubes extend downwardly into the lower chamber and having openings below the top thereof, and at least one of the said supply connection and the discharge connection for the liquid being treated is located in the lower chamber at a level above the said openings of the riser tubes in the lower chamber.

11. A method for concentrating liquid by evaporation comprising a. passing said liquid in contact with a fluidizable granular mass upwardly through a heat exchanger having a plurality of upwardly extending riser tubes for flow of the liquid being treated into a chamber above the heat exchanger, said tubes having open upper and lower ends; said tubes opening into said upper chamber and a lower chamber positioned below said heat exchanger, said granular mass being sufficient in quantity to occupy at least the inner tubes;

b. contacting the exterior of the tubes in the heat exchanger by a relatively hot medium for heat transfer to the liquid being treated to effect heat transfer at a rate such that the riser tubes function as a rising film evaporator for the liquid being treated;

c. collecting and discharging vapor from the upper chamber; and d. returning unvaporized liquid and the granular mass from the upper chamber to said lower chamber at a level lower than the opening of the riser tubes for recycling.

* * * * *